March 17, 1970 E. C. THOMSON 3,501,652
CIRCUIT ARRANGEMENT EMPLOYING DOUBLE INTEGRATION FOR
USE IN COMBUSTION SUPERVISION SYSTEMS
Filed April 28, 1967

United States Patent Office 3,501,652
Patented Mar. 17, 1970

3,501,652
CIRCUIT ARRANGEMENT EMPLOYING DOUBLE INTEGRATION FOR USE IN COMBUSTION SUPERVISION SYSTEMS
Elihu Craig Thomson, Wellesley, Mass., assignor to Electronics Corporation of America, Cambridge, Mass., a corporation of Massachusetts
Filed Apr. 28, 1967, Ser. No. 634,580
Int. Cl. H03k 1/00
U.S. Cl. 307—310      11 Claims

ABSTRACT OF THE DISCLOSURE

A combustion supervision system employs a UV avalanche discharge flame sensor whose output pulses are applied via a pulse stretcher network including a transistor to a first integrating network employing an averaging capacitor an adjustable resistor for controlling a switching transistor. The output of the switching transistor is applied to a second integrating network employing a capacitor and a resistor that in turn controls the flame relay. The first integrating network turns its switching transistor on when the charge on the averaging capacitor reaches a first threshold level set as a function of detected radiation in the combustion chamber and the resulting output energizes the flame relay via the second transistor switch. The charge on the averaging capacitor is limited through the first transistor switch to a threshold level close to the first threshold level. When the charge on the averaging capacitor drops below the first threshold level, the second integrating network becomes operative to de-energize the flame relay after a predetermined time interval independent of reduced charge on the averaging capacitor due, for example, to background radiation in the combustion chamber.

SUMMARY OF INVENTION

This invention relates to electrical control circuitry and more particularly to control circuitry particularly adapted for use in combustion supervision systems.

In a combustion supervision system employing a radiation detector of the avalanche discharge type, that detector typically delivers pulses of energy at a random rate which results in an average signal that is proportional to incident UV radiation. These pulses are frequently fed into an integrating or averaging capacitor to produce a capacitor voltage proportional to incident UV radiation, which capacitor controls the energization of a flame relay. If the UV signal should disappear due to loss of flame in the combustion system, the flame relay will de-energize after an interval determined by the time constant of the integrating circuit associated with the capacitor, and safety considerations require that this time not exceed a certain minimum. Frequently, however, such as in multiple burner installations for example, there may be residual radiation even after complete loss of the monitored flame. The sensing by the detector of this residual radiation contributes additional pulses to the capacitor and thus prolongs the drop out time of the flame relay such that it may exceed the specified minimum.

It is an object of this invention to provide novel and improved control circuit arrangements for use in combustion supervision systems which minimizes the dependence of the drop out time of the flame relay on background conditions such as residual radiation.

The invention features a control circuit arrangement for use in a combustion control system which energizes a flame relay when the average pulse signal level from a flame sensor reaches a predetermined value and which de-energizes the flame relay when that average pulse signal level falls below the predetermined value for a predetermined time. That control circuit arrangement includes two integrating systems, each of which includes a control device that has an input circuit and an output circuit. Coupled to the input circuit of the first control device is an energy storage element and associated circuitry which responds to signals from the radiation sensor and upon storage of a predetermined amount of energy causes the first control device to switch from a first conductive state to a second conductive state, typically from a non-conductive to a conductive state. The output circuit of the first control device is coupled to the input circuit of the second control device and interposed in that connection is a second energy storage element and associated circuitry which provides a second and typically (although not necessarily) different time constant than the time constant associated with the first integrating network circuitry. The output circuit of the second control device is connected to energize the flame relay or other combustion indicator of the combustion control system. The circuit arrangement also features a charge limiting arrangement for the first energy storage element so that the energy stored in that element is limited to a value related to the energy required to switch the first control device from its first conductive state to its second conductive state.

In operation, the circuit, when the first control device does switch from its first conductive state to its second conductive state in response to accumulation by the first energy storage element of a predetermined threshold level of signals from the radiation sensor causes the second energy storage device to store energy and changes the conductive state of the second control element to energize the flame relay. The energy storage of the first element is limited by a second threshold level coordinated with the first level. Should the average signal from the radiation sensor decrease below the level necessary to maintain the first energy storage element at the first threshold level, the first control device switches to its first conductive state and in response to that switching, and independent of energy levels lower than the first threshold that may be stored by the first energy storage device, a timing interval as determined by the time constant of the second integrating network is initiated and at the end of that time interval, unless the first control device has been caused to switch back to its second conductive state during that interval the flame relay will drop out.

Thus the invention provides a double integration system which integrates or averages individual pulses to give an output when the average pulse rate over a period of time exceeds a pre-established threshold level and a second integration system which averages fluctuations of the output of the first integration system above and below the threshold of the first system over a second predetermined period of time, and which provides a control output if the average pulse rate remains above the threshold level and delays for a fixed period of time the absence of the control output if the average pulse rate falls and remains below the threshold. A second threshold is also utilized to limit the charge permitted to accumulate in the first integration system so that the time required to initiate the time delay of the second integration system is small. The circuit arrangement has a great deal of flexibility, for example, the time constant of the first integration system may be large, improving the averaging characteristics of that circuit, while the time constant of the second integrating system is relatively small. The circuit arrangement can be adapted to a variety of combustion supervision applications through provision of selection of component values of the integrating systems.

Other objects, features and advantages of the invention will be seen as the following description of particular embodiments thereof progresses, in conjunction with the drawing, in which.

DESCRIPTION OF PARTICULAR EMBODIMENTS

Figure 1:
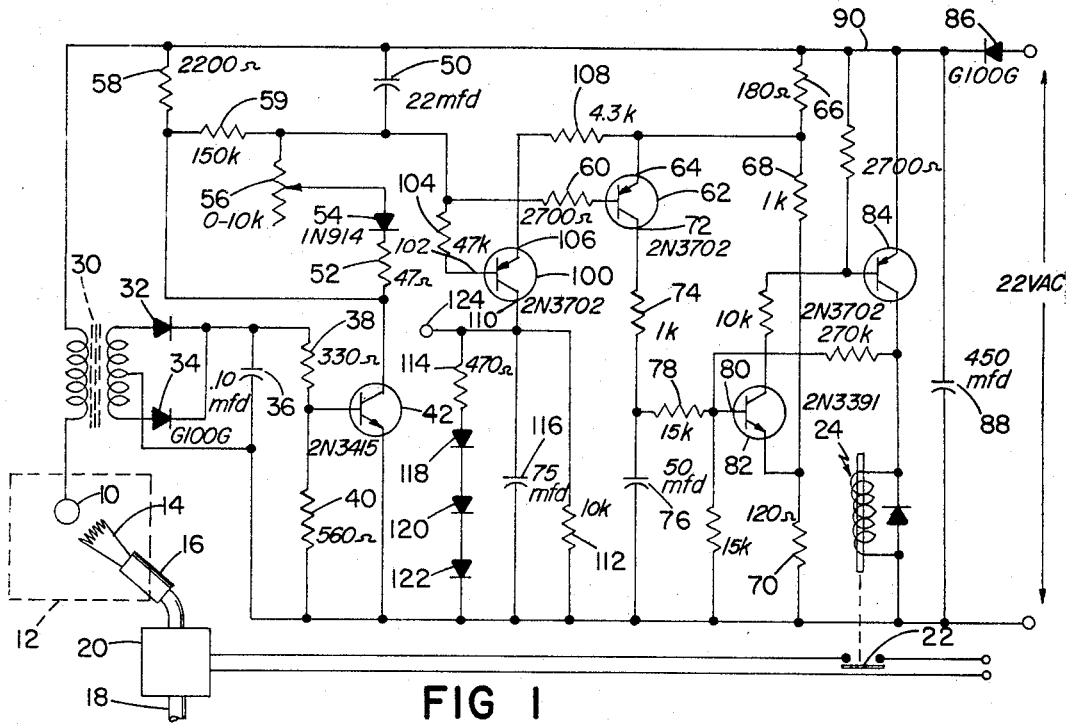
FIG. 1 is a schematic diagram of an embodiment of the invention.

With reference to FIG. 1, an ultraviolet radiation sensor 10 of the avalanche discharge type is disposed in a combustion chamber diagrammatically indicated at 12 to sense flame 14 from main burner 16. Fuel flow to burner 16 is through conduit 18 as controlled by solenoid valve 20 which in turn is controlled by contacts 22 of flame relay 24.

Transformer 30 receives short pulses (a typical duration being about two microseconds) of either polarity from ultraviolet sensor tube 10 and transforms them to low voltage high current pulses which are rectified by diodes 32, 34 and applied to a pulse stretching network that includes capacitor 36, resistors 38 and 40, and transistor 42. In response to each pulse from sensor 10, transistor 42 produces an output pulse of substantially greater duration so that the output pulse energy in response to each input pulse is increased.

The output pulse energy is applied to charge a pulse averaging capacitor 50 in first integrating system whose components also include resistor 52, diode 54 and adjustable resistor 56. Resistors 58 and 59 provide a relatively high impedance discharge path for capacitor 50. (A second adjustable resistor (not shown) is provided in a particular embodiment for alternate interconnection in the circuit to permit ready application of the circuit arrangement to different fuels employed in combustion supervision systems.)

Connected to pulse averaging capacitor 50 via resistor 60 is a threshold transistor 62 having its emitter electrode 64 biased to a first threshold level via the resistor 66 of the voltage divider network that further includes resistors 68 and 70. The collector electrode 72 of transistor 62 is connected through resistor 74 to a second integrating network that includes capacitor 76 and that capacitor is connected in turn via resistor 78 to base electrode 80 of transistor 82. Transistor 82 together with transistor 84 constitute a bistable circuit for energizing relay 24. The coil of relay 24 is connected in the collector circuit of transistor 84 and its armature is picked up when transistor 84 becomes conductive to close contacts 22.

Diode 86 and capacitor 88 connected to a suitable source of voltage to provide a B+ voltage on bus 90 for energizing the circuit.

In operation, when pulses are produced by sensor 10 with sufficient frequency, capacitor 50 becomes charged to a potential lower than the threshold produced by resistor 66 and transistor 62 is switched to conductive condition. Transistor 62 in conductive condition passes current to charge capacitor 76 at a rate determined by resistor 74 until the voltage of capacitor 76 is sufficient to switch transistor 82 into conduction. When transistor 82, and in turn transistor 84, conducts relay 24 is energized providing an indication of flame in the combustion chamber 12, and for example, turning on the main fuel control valve 20.

Once transistor 62 becomes conductive, a second threshold level is provided by the emitter base junction of that transistor, and the level to which capacitor 50 is charged is limited by that level and additional capacitor charging energy is bypassed through resistor 60 and transistor 62 so that a fixed level of energy only slightly above the first threshold is maintained on capacitor 50. Should the pulse rate from sensor 10 drop below a level required to sustain the first threshold level, transistor 62 will become non-conductive and the second integrating network including capacitor 76 will become operative. A discharging circuit for capacitor 76 is established via resistor 78 and unless the charge on capacitor 50 of the first integrating network is returned to its actuating threshold level flame relay 24 will drop out after the time constant of the network, determined principally by capacitor 76 and resistor 78, and the flow of fuel to the combustion chamber is terminated after a time delay controlled by the second integrating network and independently of the low level radiation for example sensed in the combustion chamber.

A further feature of the circuit arrangement utilizes the fact that the current flow through resistor 60 is an indication of the strength of the signal provided by sensor 10 (and the amount of flame in the supervised combustion chamber). A circuit for sensing that current flow includes transistor 100 that has its base electrode 102 connected via resistor 104 to capacitor 50 and its emitter electrode 106 connected via resistor 108 to emitter electrode 64 of transistor 62. An output network connected to the collector electrode 110 of transistor 100 includes resistor 112, 114, capacitor 116 and diodes 118, 120, 122, which network output at terminal 124 provides an indication of the excess flame signal in the combustion chamber as a logarithmic function of the current flow through resistor 60.

Figure 2:
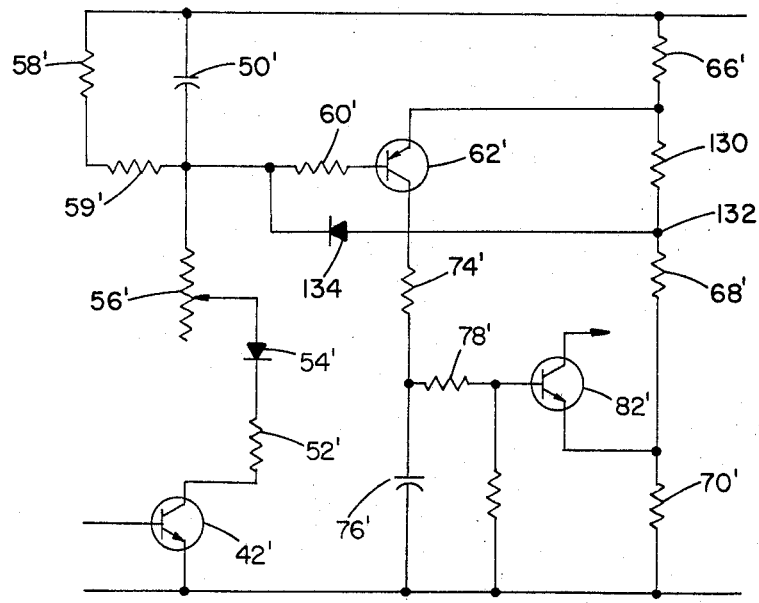
FIG. 2 is a schematic diagram of a modification of the circuitry of FIG. 1.

A modified circuit in which greater discrimination is provided between the first and second threshold levels is shown in FIG. 2. In that circuit components that correspond to components shown in FIG. 1 have the same reference numeral plus a prime. For example, capacitor 50' forms a part of the first integrating system and capacitor 76' forms a part of the second integrating system. An additional bias voltage level is provided by resistor 130 in the voltage divider network that includes resistors 66', 68' and 70'. The junction 132 establishes the second threshold level via diode 134 to limit the maximum charge level of capacitor 50'. (It is preferred to increase the value of resistor 60' and employ a higher gain switching transistor 62 in this circuit than in the circuit of FIG. 1.) By means of the value of resistor 130 the differential between the two threshold levels can be varied as desired.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention.

What is claimed is:

1. In a combustion control system including a flame sensor and a combustion condition indicator,
a circuit arrangement for operating said combustion condition indicator comprising first integrating means including a first control means having an input circuit and an output circuit and a first energy storage element connected to the input circuit of said first control means, said first integrating means, in response to pulse signals from said radiation sensor of a first threshold magnitude providing an output signal when said first control means is switched from a first conductive state to a second conductive state,
means for limiting the energy stored by said first energy storage element to a predetermined threshold value,
second integrating means including a second control means having an input circuit and an output circuit and a second energy storage element connected to the input circuit of said second control means,
the output circuit of said first control means also being connected to the input circuit of said second control means for switching the conductive state of said second control means in response to switching of said first control means to said second conductive state, said second integrating means having a predetermined time constant and maintaining said second control means in a conductive condition for a predetermined time interval after said first control means has returned to said first conductive state, and means for connecting the output circuit of said second control device to said combustion condition indicator.

2. The circuit arrangement as claimed in claim 1 wherein said first control means is a transistor and further including a network connected to said transistor for limiting the charge level to be accumulated on the energy storage element of said first integrating means.

3. The circuit arrangement as claimed in claim 1 wherein said flame sensor is an ultraviolet radiation sensor of the avalanche discharge type.

4. The circuit arrangement as claimed in claim 3 wherein said first control means is a transistor and said energy limiting means includes the emitter base junction of said transistor.

5. The circuit arrangement as claimed in claim 3 wherein said energy limiting means includes a voltage divider network and a circuit connected between said network and said first energy storage element and bypassing said first control means.

6. The circuit arrangement as claimed in claim 1 and further including circuitry for increasing the energy of pulse signals applied to said first integrating means in response to pulse signals from said radiation sensor.

7. The circuit arrangement as claimed in claim 1 wherein said first control means is a transistor including emitter, base and collector electrodes, and further including a resistor interposed between said base electrode and said first energy storage element, and means for providing an indication of the magnitude of current flow through said resistor to provide an indication of the magnitude of the flame condition in the supervised combustion chamber.

8. The circuit arrangement as claimed in claim 7 wherein current flow indication means provides a logarithmic indication of current magnitude and includes a second transistor having its input circuit connected across said resistor and a diode network conected to its output circuit.

9. The circuit arrangement as claimed in claim 8 wherein said flame sensor is an ultraviolet radiation sensor of the avalanche discharge type.

10. The circuit arrangement as claimed in claim 9 wherein said energy limiting means includes the emitter base junction of said transistor.

11. The circuit arrangement as claimed in claim 9 wherein said energy limiting means includes a voltage divider network and a circuit connected between said network and said first energy storage element and bypassing said first control means.

References Cited

UNITED STATES PATENTS

| | | | |
|---|---|---|---|
| 2,833,938 | 5/1958 | Pinckaers | 307—231 |
| 2,879,456 | 3/1959 | Pinckaers | 317—148.5 |
| 2,919,438 | 12/1959 | Deziel | 431—79 XR |
| 2,944,152 | 7/1960 | Johnson et al. | 340—228 XR |
| 3,075,128 | 1/1963 | Cutsogeorge et al. | 317—148.5 |
| 3,013,160 | 12/1961 | Reiner | 307—260 |
| 3,336,479 | 8/1967 | Blackett | 328—6 XR |

JOHN S. HEYMAN, Primary Examiner

S. T. KRAWCZEWICZ, Assistant Examiner

U.S. Cl. X.R.

307—293; 317—130, 148.5; 328—6, 127; 340—228; 431—79